United States Patent
Chawla et al.

(10) Patent No.: US 11,481,685 B2
(45) Date of Patent: Oct. 25, 2022

(54) MACHINE-LEARNING MODEL FOR DETERMINING POST-VISIT PHONE CALL PROPENSITY

(71) Applicant: T-Mobile USA, Inc., Bellevue, WA (US)

(72) Inventors: Hemant Chawla, Bothell, WA (US); Sarvesh Kaushal, Everett, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 183 days.

(21) Appl. No.: 17/095,648

(22) Filed: Nov. 11, 2020

(65) Prior Publication Data

US 2022/0147863 A1    May 12, 2022

(51) Int. Cl.

| | | |
|---|---|---|
| *G06N 20/00* | (2019.01) | |
| *G06N 7/00* | (2006.01) | |
| *G06Q 30/00* | (2012.01) | |
| *H04M 3/51* | (2006.01) | |
| *G06Q 10/10* | (2012.01) | |
| *H04L 67/02* | (2022.01) | |
| *H04L 51/02* | (2022.01) | |
| *G06Q 30/02* | (2012.01) | |
| *H04M 3/523* | (2006.01) | |
| *H04L 67/50* | (2022.01) | |

(52) U.S. Cl.
CPC ............ *G06N 20/00* (2019.01); *G06N 7/005* (2013.01); *G06Q 10/10* (2013.01); *G06Q 30/016* (2013.01); *G06Q 30/0201* (2013.01); *H04L 51/02* (2013.01); *H04L 67/02* (2013.01); *H04L 67/535* (2022.05); *H04M 3/5158* (2013.01); *H04M 3/5183* (2013.01); *H04M 3/5191* (2013.01); *H04M 3/523* (2013.01); *H04M 3/5232* (2013.01)

(58) Field of Classification Search
None
See application file for complete search history.

(56) References Cited

U.S. PATENT DOCUMENTS

| | | | |
|---|---|---|---|
| 9,275,342 B2 | 3/2016 | Vijayaraghavan et al. | |
| 9,467,567 B1* | 10/2016 | Barkan | G06Q 10/06 |
| 9,998,596 B1* | 6/2018 | Dunmire | H04M 3/5158 |
| 10,200,420 B2* | 2/2019 | Kannan | H04L 12/1827 |
| 10,402,737 B1* | 9/2019 | Malalel | H04L 67/306 |

(Continued)

*Primary Examiner* — Lashonda Jacobs-Burton
(74) *Attorney, Agent, or Firm* — Han Santos, PLLC (57) ABSTRACT

Call propensity source data may be received that include a first percentage of call propensity source data that correspond to presence of post-visit phone calls to a customer service of an entity after some customer visits to a web site of an entity and a second percentage of call propensity source data that correspond to absence of post-visit phone calls to the customer service after other customer visits to the website. A machine-learning model is trained based on a plurality of features in at least a portion of the call propensity source data to generate a trained machine-learning model. The trained machine-learning model is applied to multiple features included in at least one of corresponding website activity data and corresponding activity error data of a customer to generate a probability score that measures a likelihood of the customer calling the customer service regarding an issue that is unresolved via the website.

20 Claims, 5 Drawing Sheets

(56) References Cited

U.S. PATENT DOCUMENTS

| | | | |
|---|---|---|---|
| 11,012,563 B1* | 5/2021 | Beall | H04M 3/5183 |
| 11,019,211 B1* | 5/2021 | Kwak | G06N 3/084 |
| 11,361,941 B2* | 6/2022 | Kim | H01J 37/32174 |
| 2009/0016507 A1* | 1/2009 | Altberg | H04M 3/4878 |
| | | | 379/114.01 |
| 2009/0177599 A1* | 7/2009 | Bhaskar | G06N 3/126 |
| | | | 706/13 |
| 2012/0296682 A1* | 11/2012 | Kumar | G06Q 10/00 |
| | | | 705/7.11 |
| 2014/0316851 A1* | 10/2014 | Doganata | G06Q 30/0201 |
| | | | 705/7.29 |
| 2017/0140387 A1 | 5/2017 | Nandi et al. | |
| 2018/0278748 A1* | 9/2018 | Avila | G06Q 10/06398 |
| 2019/0124127 A1* | 4/2019 | Kannan | H04L 65/403 |
| 2019/0180358 A1* | 6/2019 | Nandan | G06K 9/6219 |
| 2019/0394332 A1* | 12/2019 | Dunmire | H04M 3/5183 |
| 2020/0027102 A1* | 1/2020 | Xu | G06Q 30/0204 |
| 2020/0034665 A1* | 1/2020 | Ghanta | G06N 20/00 |
| 2021/0117977 A1* | 4/2021 | Kim | G06F 17/15 |
| 2021/0241167 A1* | 8/2021 | Li | G06F 8/65 |
| 2021/0321000 A1* | 10/2021 | Gopalan | G06F 40/30 |
| 2021/0390424 A1* | 12/2021 | Vo | G06Q 30/0185 |
| 2021/0406711 A1* | 12/2021 | Ang | G06F 9/547 |
| 2022/0091078 A1* | 3/2022 | Sakai | G01N 30/8631 |

* cited by examiner

MACHINE-LEARNING MODEL FOR DETERMINING POST-VISIT PHONE CALL PROPENSITY

BACKGROUND

The ability for customers to use a website of a service provider to self-serve can enhance customer experience and lower service costs for the service provider. For example, a mobile network operator (MNO) may provide its wireless telecommunication service customers with access to a website that enables the customers to make payments for wireless telecommunication services, switch between wireless service plans, buy new devices, etc. In some instances, customers may encounter issues or problems while attempting to self-serve through a website. When these issues or problems occur, customers may resort to calling customer service of the service provider to resolve them. However, these issues or problems can often be easily resolved without calling customer service if the customers are provided with some additional information on how to use the services provided by the website.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

This disclosure is directed to techniques that enable a call prediction application of a service provider to use a machine-learning model to predict whether a customer is likely to make a post-visit phone call regarding a corresponding issue to the customer service of the service provider following a visit to a website of the service provider. The corresponding issue may be an issue that the customer was unable to resolve when the customer visited a website of the service provider. In the event that the machine-learning model predicts that the customer is likely to make the post-visit phone call, the call prediction application may proactively surface a solution for the issue to the customer. The solution may be surfaced by presenting the solution to the customer via the website when the customer revisits the website, sending an access link to the solution in an electronic communication to the customer, or initiating a virtual chat agent to chat with the customer about the solution.

In various embodiments, the machine-learning model may be trained based on call propensity source data that include website activity data, activity error data, and customer service call records. The website activity data may track customer interactions with various self-service tools (e.g., a payment tool, a product ordering tool, etc.) that are made by various customers during customer visits to the website. The activity error data may track errors that occurred during self-service tool usages by the customers, such as failure to complete a navigation flow of a self-service tool, timeouts by a server, a network, or an application while using the self-service tool, usage cancellation during the usage of the tool, and/or so forth. The activity error data may be mapped to at least some of the website activity data. The customer service call records may include information on the post-visit phone calls made after some of the customer visits, in which each call in the customer service call records is mapped as a dependent to a corresponding visit.

During the training of the machine-learning model, the call propensity source data may be divided into a test data set and a training data set. Hybrid sampling may be applied to some of the call propensity source data in the training data set to increase the proportion of data in the training data set that corresponds to the presence of post-visit phone calls to customer service by customers following customer visits. The features in the training data set are then indexed and used to train the machine-learning model using a model training algorithm, such as a Random Forest training algorithm, a Gradient Boost training algorithm, or an XG Boost training algorithm. The trained machine-learning model is then validated using the test data set. If the trained machine-learning model is validated, the trained machine-learning model may be used to analyze website activity data and activity error data related to one or more recent visits to the website by a particular customer. The analysis may generate a probability score that measures a likelihood of the particular customer calling the customer service regarding an issue that is unresolved via the website after visiting the website.

In some embodiments, a feature selection analysis may be performed following usage of the trained machine-learning model to generate multiple probability scores for different customers. The feature analysis may be performed to determine a list of top features in the call propensity source data that are most predictive of a customer calling the customer service. The top features of the call propensity source data may be further used to train a machine-learning model to produce an additional trained machine-learning model that generates probability scores. For example, the additional trained machine-learning model may generate the probability more efficiently and/or accurately than the trained machine-learning model.

By using a trained machine-learning model to predict that certain customers are likely to call customer service following visits to the website of a service provider regarding unresolved issues and proactively providing these customers with solutions to the issues, the service provider may reduce the number of such post-visit phone calls to customer service while increasing customer satisfaction with the service provider. The reduction in the volume of customer calls to customer service may result in human resource and monetary savings for the service provider. The techniques described herein may be implemented in a number of ways. Example implementations are provided below with reference to the following figures.

Example Architecture

Figure 1:
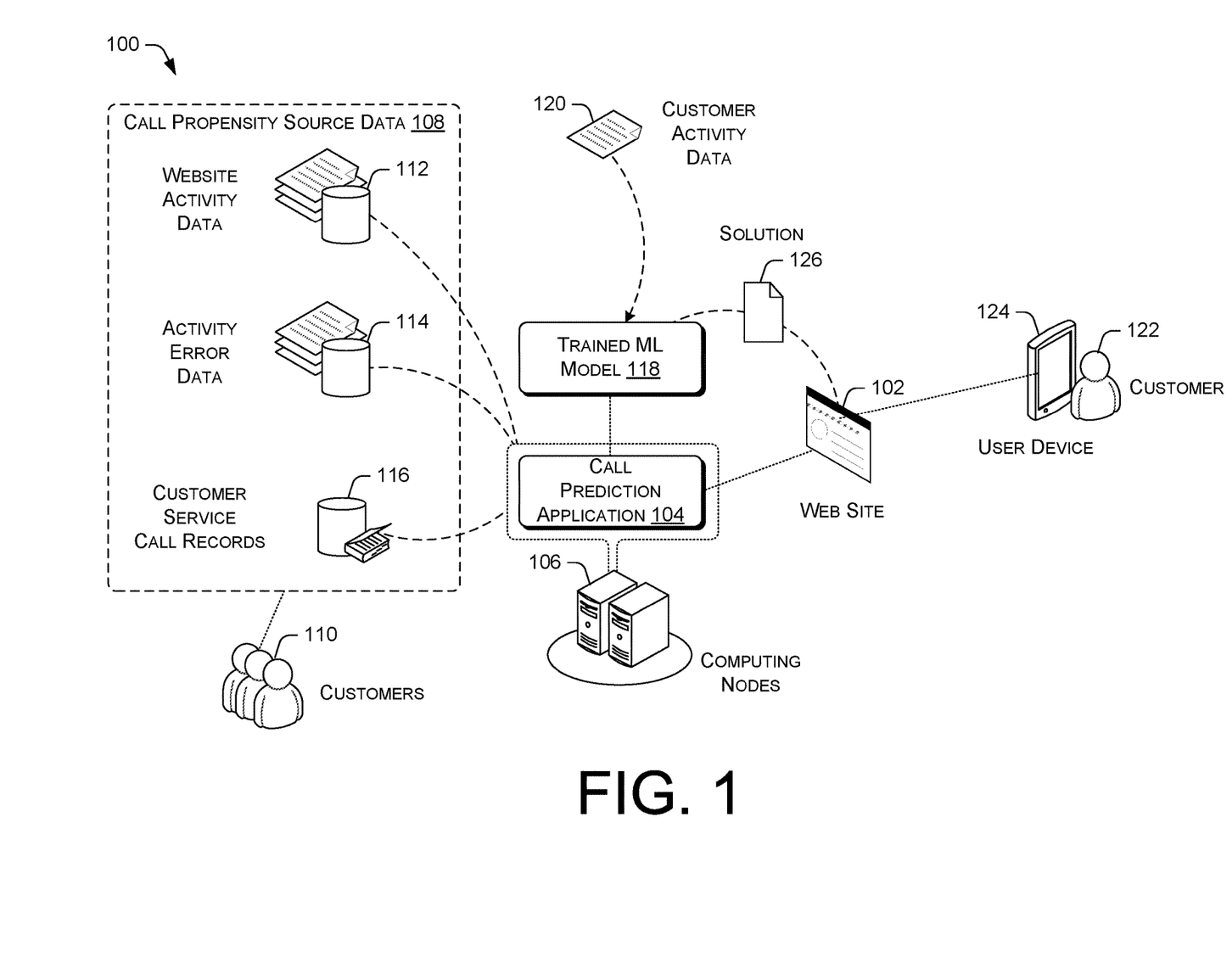
FIG. 1 illustrates an example architecture that enables a service provider to use a machine-learning model to determine a post-visit propensity of a customer to call customer service regarding an issue following a visit to a website of the service provider.

FIG. 1 illustrates an example architecture 100 that enables a service provider to use a machine-learning model to determine a post-visit propensity of a customer to call customer service regarding an issue following a visit to a website of the service provider. The architecture 100 may include a website 102 and a call prediction application 104. The website 102 may be provided by a web server that is operated by the service provider. The website 102 may be accessed via the Hypertext Transfer Protocol (HTTP) protocol from a web browser. In turn, the web server may provide the web browser with access to multiple web pages. Each of the web pages may include text content, images, multimedia content, cascade style sheets (CSS), and/or scripts. The web server may support server-side scripting via multiple scripting languages, such as Active Server Pages (ASP), Hypertext Preprocessor (PHP), JavaScript, and other scripting languages. Accordingly, the website 102 may provide customers with access to various self-service tools. For example, the website of a service provider that is a mobile network operator (MNO) may be configured with self-service tools that enable customers to make payments for wireless communication services, switch between wireless service plans, buy new devices, etc.

The call prediction application 104 may execute on one or more computing nodes 106. The call prediction application 104 may train a machine-learning model that is able to predict whether a customer is likely to make a post-visit phone call regarding a corresponding issue to the customer service of the service provider following a visit to the website 102. The corresponding issue may be an issue that the customer was unable to resolve when the customer visited a website of the service provider. Customer service refers to a department or organization of an entity that is staffed by human customer service representatives (CSRs). The CSRs may be tasked with answering customer questions, solving customer issues, and/or performing other duties for customers, in which the CSRs are reachable by calling one or more dedicated phone numbers.

The call prediction application 104 may train the machine-learning model based on call propensity source data 108 of various customers 110 that previously visited the website 102. The call propensity source data 108 may include website activity data 112, activity error data 114, and customer service call records 116. The website activity data 112 may track customer interactions with various self-service tools (e.g., a payment tool, a product ordering tool, etc.) that are made by the customers 110 during customer visits to the website 102. The activity error data 114 may track errors that occurred during self-service tool usages by the customers 110, such as failure to complete a navigation flow of a self-service tool, timeouts by a server, a network, or an application while using the self-service tool, and/or so forth. The activity error data 114 may be mapped to at least some of the web site activity data 112. The customer service call records 116 may include information on the post-visit phone calls made after some of the customer visits, in which each call in the customer service call records 116 is mapped as a dependent to a corresponding visit to the website 102. For example, the information may include dates and times of the post-visit phone calls, the time durations of the post-visit phone calls, and/or so forth.

During the training of the machine-learning model, the call prediction application 104 may divide the call propensity source data 108 into a test data set and a training data set. Hybrid sampling may be applied to some of the call propensity source data in the training data set to increase the proportion of data in the training data set that corresponds to the presence of post-visit phone calls to customer service by customers following customer visits. The data that corresponds to such presence may include relevant web site activity data, activity error data, and customer service call records that can be tied to the post-visit phone calls.

The features in the training data set are then indexed and used by the call prediction application 104 to train the machine-learning model using a model training algorithm to produce a trained machine-learning model 118. For example, the model training algorithm may be a Random Forest training algorithm, a Gradient Boost training algorithm, or an XG Boost training algorithm. The call prediction application 104 may validate the trained machine-learning model 118 using the test data set. If the trained machine-learning model 118 is validated, the trained machine-learning model 118 may be used to analyze customer activity data 120 of a customer 122. The customer activity data 120 may include web site activity data and activity error data related to one or more recent visits to the website 102 by the customer 122. However, in one scenario, it is possible that the customer activity data 120 may lack activity error data. The customer 122 may have used a web browser on a user device 124 to make one or more visits the website 102. Accordingly, the trained machine-learning model 118 may be used to generate a probability score that measures a likelihood of the customer 122 calling the customer service of the service provider regarding an issue that is unresolved via the website 102 after visiting the website.

Thus, if the probability score exceeds a predetermined score threshold, the call prediction application 104 may proactively surface a solution 126 for the issue to the customer. The solution 126 may be surfaced by presenting the solution 126 via the website 102 to the customer when the customer revisits the website 102, sending an access link to the solution 126 in an electronic communication to the customer 122, or initiating a virtual chat agent to chat with the customer 122 about the solution 126 via a client application on the user device 124. For example, if the issue is that the customer was unable to find the status of a recent order on the website 102, the call prediction application 104 may present the customer with a web page link to an order status web page when the customer revisits the website 102 using the web browser on the user device 124.

In some embodiments, the call prediction application 104 may perform a feature selection analysis following usage of the trained machine-learning model 118 to generate multiple probability scores for different customers. The feature analysis may be performed to determine a list of top features in the call propensity source data that are most predictive of a customer calling the customer service. The top features of the call propensity source data may be further used by the call prediction application 104 to produce an additional machine-learning model that generates additional probability scores based on additional customer activity data of customers. The additional machine-learning model may be used to generate the additional probability scores in a more efficient manner and/or with a higher degree of accuracy than the trained machine-learning model 118.

Example Call Prediction Application Components

Figure 2:
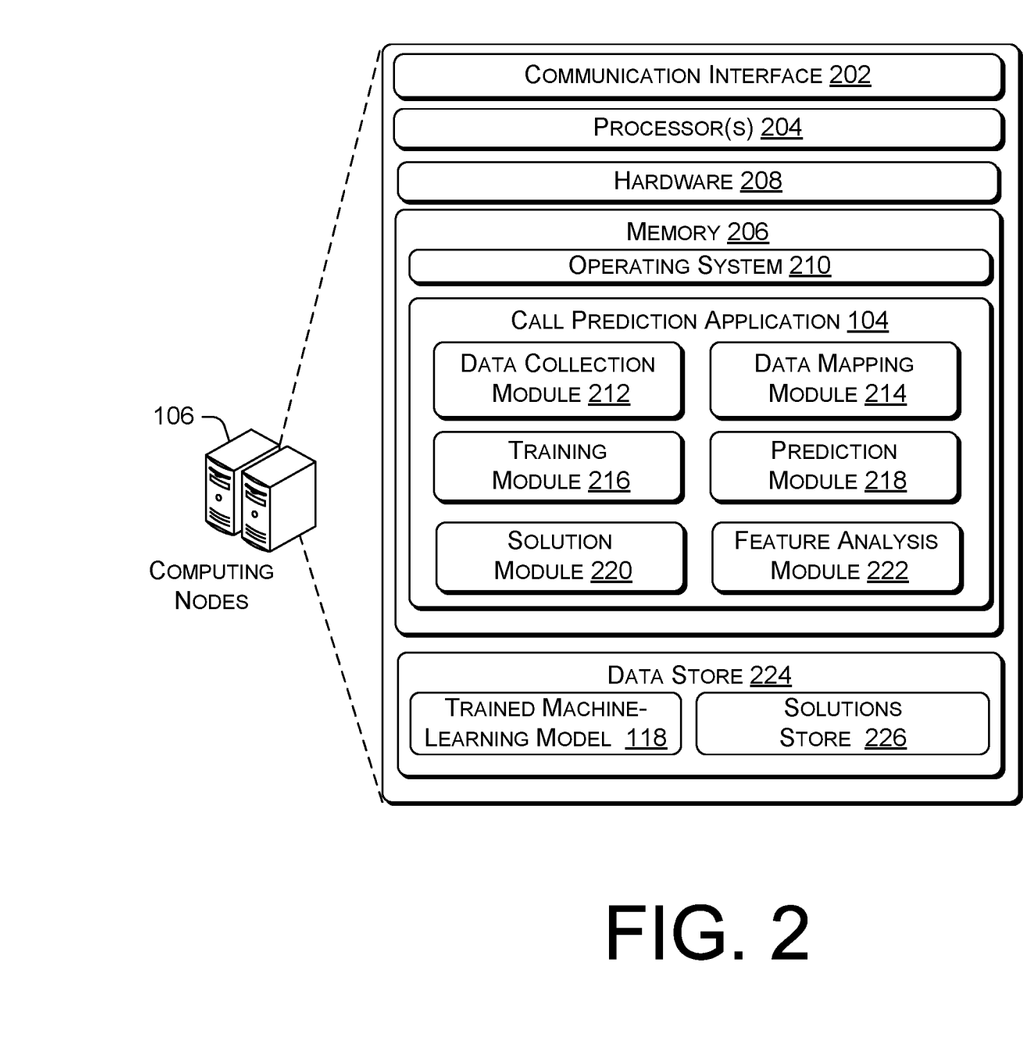
FIG. 2 is a block diagram showing various components of a call prediction application that uses a machine-learning model for determining a post-visit propensity of a customer to call customer service regarding an issue following a visit to a website of a service provider.

FIG. 2 is a block diagram showing various components of a call prediction application that uses a machine-learning model for determining a post-visit propensity of a customer to call customer service regarding an issue following a visit to a website of a service provider. The call prediction application 104 may be executed by the one or more computing nodes 106. The computing nodes 106 may provide a communication interface 202, one or more processors 204, memory 206, and hardware 208. The communication interface 202 may include wireless and/or wired communication components that enable the devices to transmit data to and receive data from other networked devices. The hardware 208 may include additional hardware interface, data communication, or data storage hardware. For example, the hardware interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 206 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The processors 204 and the memory 206 of the computing nodes 106 may implement an operating system 210. In turn, the operating system 210 may provide an execution environment for the call prediction application 104. The operating system 210 may include components that enable the computing nodes 106 to receive and transmit data via various interfaces (e.g., user controls, communication interface, and/or memory input/output devices), as well as process data using the processors 204 to generate output. The operating system 210 may include a presentation component that presents the output (e.g., display the data on an electronic display, store the data in memory, transmit the data to another electronic device, etc.). Additionally, the operating system 210 may include other components that perform various additional functions generally associated with an operating system.

The call prediction application 104 may include a data collection module 212, a data mapping module 214, a training module 216, a prediction module 218, a solution module 220, and a feature analysis module 222. The modules may include routines, program instructions, objects, and/or data structures that perform particular tasks or implement particular abstract data types. The memory 206 may also include a data store 224 that is used by the call prediction application 104.

The data collection module 212 may retrieve data from the one or more data sources that store the call propensity source data 108 of various customers. In various embodiments, the data collection module 212 may use data adaptors to retrieve the call propensity source data 108 from one or more databases. For example, the data collection module 212 may use data-agnostic data adaptors to access unstructured databases, and/or database-specific data adaptors to access structured databases. The one or more databases may be configured to store information and records generated or compiled by various website activity and customer service call monitoring applications. In some embodiments, the data collection module 212 may include a workflow scheduler that schedules the retrieval of the call propensity source data 108 according to a configurable policy. For example, the configurable policy may specify the source data locations, dates and times of data retrievals, frequency of data retrievals, triggering events for the data retrievals, handling procedures for late arrival data, a data retention period, data disposal following an expiration of the data retention period, and/or so forth.

The data collection module 212 may store the retrieved call propensity source data 108 in a data staging area of the data store 224. The call propensity source data 108 retrieved by the data collection module 212 may include website activity data 112 and activity error data 114 from a first time period (e.g., a 30-day time period, a 60-day time period, etc.). The customer service call record 116 in the call propensity source data 108 retrieved by the data collection module 212 may include data on calls made to the customer service during a second time period of equal or similar length that starts within a predetermined number of days (e.g., four days) following the first time period. For example, if the first time period is Jun. 25, 2020 to Jul. 22, 2020 then the second time period may be Jun. 27, 2020 to Jul. 26, 2020.

The website activity data for each of the customers may include information related to the navigation flows of the self-service tools visited by the customer. For example, in the context of an MNO, the self-service tools may include tools for making a one-time payment, setting up an equipment installment payment plan, setting up autopay, changing a wireless plan, purchasing a device, unlocking a device, and/or so forth. A navigation flow of a self-service tool may include a series of uniform resource locators (URLs) of web pages that make up the steps of the navigation flow, in which the steps may be referred to as levels. Accordingly, the website activity data of the customer may include information such as the time duration the customer spent on each level of a navigation flow during a most recent visit, the time duration the customer spent on each level of a navigation flow during each previous visit within a predetermined time period of the most recent visit, the total amount of time spent in each navigation flow during a most recent visit and all prior visits, the visit frequency and time spent on the website 102 during multiple predetermined past time periods (e.g., last day, last seven days, last 14 days, etc.), and/or so forth.

The activity error data for each of at least some customers may include information related to errors that occurred during use of the navigation flows of the self-service tools by the consumer. For example, such error may have occurred during payment processing, cancellation of automatic payment, updating of autopay information, scheduling of a payment, canceling a scheduled payment, searching for payment information, searching for order status, and/or so forth. The errors may include failures to complete a navigation flows of the self-service tools, timeouts by a server, a network, or an application while using the self-service tools, usage cancellation during the usage of the tools, and/or so forth. Each set of website activity data entries and each set of activity error data entries of a specific customer may be labeled with a unique subscriber identifier of the customer. For example, the subscriber identifier may be a Mobile Station International Subscriber Directory Number (MSISDN) of the customer. These respective data entries may serve as features for training a machine-learning model.

The customer service call records for each of at least some customers may include information such as dates and times of phone calls to customer service by the customer, the duration of the phone calls to customer service, etc. Likewise, each customer service call record of a specific customer may be labeled with a unique subscriber identifier, e.g., MSISDN, of the customer.

The data mapping module 214 may map the activity error data 114 and the customer service call records 116 of the call propensity source data 108 to the website activity data 112. In various embodiments, the data and/or records for each customer may be correlated by the data mapping module 214 based on a subscriber identifier of each piece of data and/or each record. In such embodiments, an activity error data entry of particular a customer may be mapped to a web site activity data entry of the particular customer using a predetermined time interval. For example, the data mapping module 214 may map the activity error data entry of the particular customer to the website activity data entry when the activity error data entry captures an error event that occurred within one hour of a web site visit event of the particular customer as captured by the website activity data entry. Further, a customer service call event of a particular customer, which is captured by a corresponding customer service call record, may be mapped as a dependent to a website visit event of the particular customer as captured by a corresponding website activity data entry. The data mapping module 214 may perform such a mapping when the call event occurred within a predetermined time frame (e.g., four days) of the website visit event. Once the mapping is complete, the data mapping module 214 may provide the mapped call propensity source data 108 as training data to the training module 216.

Since not all website visits by customers result in a follow up phone call to customer care, the mapped call propensity source data 108 may include a first percentage of call propensity source data 108 that corresponds to presence of post-visit phone calls to the customer service after customer visits to the website 102, i.e., "called" data. The mapped call propensity source data 108 may further include a second percentage of call propensity source data 108 that corresponds to absence of post-visit phone calls to the customer service after customer visits to the website 102, i.e., "no-call" data. For example, in one instance, the first percentage may be 7%, and the second percentage may be 93%.

The training module 216 may train a machine-learning model so that the machine-learning model generates probability scores based on the customer activity data of customers. The customer activity data may include website activity data, and in some instances, corresponding activity error data. Each of the probability scores measures a likelihood of a particular customer calling the customer service of the service provider regarding an issue that is unresolved via the website after visiting the website. In various embodiments, the training module 216 may initially apportion the mapped call propensity source data 108 into a test data set and training data set according to a predetermined apportionment ratio. For example, the apportionment ratio may be 1:9. Accordingly, the training module 216 may split the call propensity source data 108 such that 10% of the call propensity source data 108 is the test data set and 90% of the call propensity source data 108 is the training data set.

In some embodiments, the training module 216 may perform a hybrid sampling on the training data set. For example, the first percentage (e.g., 7%) that corresponds to the presence of post-visit phone calls and the second percentage (e.g., 93%) that corresponds to the absence of post-visit phone calls in the call propensity source data 108 is carried over to the training data set during the apportionment. The first percentage (e.g., 7%) may be too low with respect to the second percentage (e.g., 93%), and this imbalance may cause the training data set to be ineffective for training a machine-learning algorithm. The hybrid sampling may increase the first percentage in proportion to the second percentage such that a ratio of the first percentage to the second percentage in the training data set meets a predetermined ratio threshold.

The hybrid sampling may include performing up-sampling of the "called" data by duplicating website activity data related to customer visits to the website by a first group of one or more customers, activity error data that are mapped to one or more of the customer visits, and customer service call records of these one or more customers, in which the first group of one or more customers made post-visit phone calls to the customer service after visiting the website 102. The hybrid sampling may further include performing under-sampling of the "no-call" data. In other words, some of the website activity data related to customer visits to the web site by a second group of one or more customers, activity error data that are mapped to one or more of such customer visits, and customer service call records of these one or more customers, in which the second group of one or more customers did not make post-visit phone calls to the customer service after visiting the website 102, may be intentionally discarded. For example, such hybrid sampling may be performed until the ratio of the "called data" and the "no-call" data in the training data set reaches a ratio threshold of 25:75, meaning that there is 25% of the "called" data in the training data set, and 75% of the "no-call" data in the training data set.

The training module 216 may use the training data set to train a machine-learning model. In various embodiments, the training may be performed based on the features in the training data set using a training algorithm. For example, the training algorithm may be one of a Random Forest training algorithm, a Gradient Boost training algorithm, or a XG Boost training algorithm. In some embodiments, the training module 216 may apply a feature transformation pipeline to the training data set prior to training of the machine-learning model. The feature transformation pipeline may be used to index the features in the training data set, label the dependents in the training data set, and/or assemble all the features in the training data set to create a single vector column for processing by a training algorithm.

Following the completion of training and the generation of the trained machine-learning model, the training module 216 may use the test data set to validate the trained machine-learning model. For example, the training module 216 may input the web activity data and the activity error data of a customer as recorded in the test data set into the trained machine-learning model 118 so that the trained machine-learning model generates a probability score. When the probability score exceeds a score threshold, the trained machine-learning model is deemed to have predicted an occurrence of a post-visit phone call to customer service. The prediction is compared to the customer service call records in the test data set to determine whether the prediction matches what actually occurred, i.e., the presence of a post-visit phone call to customer service. Such prediction and comparison may be repeated for different customers using the test data set so that a prediction accuracy percentage may be generated, in which prediction accuracy percentage measures that percentage of accurate predictions made by the trained machine-learning model for all of the predictions made. Thus, if the prediction accuracy percentage of the trained machine-learning model is above an accuracy percent threshold, then the training module 216 may determine that the trained machine-learning model is validated for use. Otherwise, the training module 216 may re-train the machine-learning model. For example, the re-training may include using a different training algorithm and/or a different set of call propensity source data.

In alternative embodiments, the training module 216 may be configured to train the machine-learning model in a slightly different manner. In such embodiments, the training module 216 may apportion different portions of the mapped call propensity source data 108 into multiple training data sets and a corresponding number of multiple test data sets, in which each apportionment is performed according to a predetermined apportionment ratio via a k-means clustering algorithm. The multiple training data sets may be used to train a machine-learning model multiple times. For example, if the predetermined apportionment ratio is 10% test data and 90% training data, the training module 216 may perform ten different apportionments via the k-means clustering algorithm to generate ten different training data sets, in which each of the training data sets contains a different 90% portion of data from the call propensity source data 108. The training module 216 may train the machine-learning model ten times using the then training data sets. Following the completion of the multiple training iterations, the training module 216 may use one or more of the multiple test data sets to validate the trained machine-learning model.

The prediction module 218 may apply a trained and validated machine-learning model, such as the trained machine-learning model 118, to customer activity data of a customer to predict whether the customer is likely to make a post-visit phone call to customer service. For example, the prediction module 218 may retrieve the customer activity data 120 of the customer 122. The customer activity data 120 may include website activity data and activity error data related to one or more recent visits to the website 102 by the customer 122. However, in one scenario, it is possible that the customer activity data 120 may lack activity error data. In various embodiments, the prediction module 218 may use data adaptors to retrieve the customer activity data 120 from one or more databases. For example, the prediction module 218 may use data-agnostic data adaptors to access unstructured databases, and/or database-specific data adaptors to access structured databases. In some embodiments, the prediction module 218 may include a workflow scheduler that schedules the retrieval of the customer activity data 120 according to a configurable policy. For example, the configurable policy may specify the source data locations, dates and times of data retrievals, frequency of data retrievals, triggering events for the data retrievals, handling procedures for late arrival data, a data retention period, data disposal following an expiration of the data retention period, and/or so forth.

By applying the trained machine-learning model 118 to the features in the customer activity data 120, the prediction module 218 may generate a probability score that measures a likelihood of the customer 122 calling the customer service of the service provider regarding a corresponding issue that is unresolved via the website after visiting the website. However, in some embodiments, the application of the trained machine-learning model 118 by the prediction module 218 may generate multiple probability scores that correspond to multiple issues. Thus, if the probability score that corresponds to a particular issue of one or more issues exceeds a predetermined score threshold, the prediction module 218 may determine that the customer 122 is likely to call customer service regarding the particular issue.

The solution module 220 may identify a solution that corresponds to an issue that is identified by the prediction module 218 as likely to result in a call to customer service by a customer. In various embodiments, the solution module 220 may access a solutions store 226 that store solutions for different issues. For example, each resolution file in the solutions store 226 may include an issue identifier, a description of the issue, a solution identifier of the solution that corresponds to the issue, a description of the solution, one or more objects associated with the solution, and/or so forth. For example, the one or more objects may include one or more web pages that implement the solution, an access link (e.g., a web page link) to the one or more web pages, and/or so forth. In this way, the solution may include a set of instructions, an application tool, a software wizard, and/or so forth that automatically assists a customer with the corresponding issue without human intervention from the customer service. The solution module 220 may receive a subscriber identifier (e.g., an MSISDN) and a corresponding issue identifier from the prediction module 218. In turn, the solution module 220 may use the solutions store 226 to identify a solution that corresponds to the issue for the customer that is identified by the subscriber identifier.

The solution module 220 may present the identified solution in multiple ways. In some instances, the solution module 220 may surface the solution via the website 102 to the customer when the customer revisits the website 102. For example, the solution module 220 may store an access link of the solution in a data cache of a web application. Accordingly, the web server may use a script to interface with the web application and retrieve the access link from the data cache for display to the customer when the customer logs into an online customer service portal, such as a website, of the service provider. In other instances, the solution module 220 may use a messaging application to present an access link of the solution in an electronic communication, such as an email message, a text message, or a client application notification message, to the customer. In additional instances, the solution module 220 may use a virtual chat agent application that is a server application to interface with a client application installed on a user device of the customer to provide the solution or the access link for the solution to the customer.

The feature analysis module 222 may perform a feature analysis to determine a list of top features in the call propensity source data that are most predictive of a customer calling the customer service. The feature analysis may be performed as the prediction module 218 uses a trained machine-learning model to generate probability scores for various issues with respect to multiple customers. The top features of the call propensity source data may be further used by the call prediction application 104 to produce an additional machine-learning model that generates additional probability scores based on additional customer activity data of customers.

Example User Interface Screen

Figure 3:
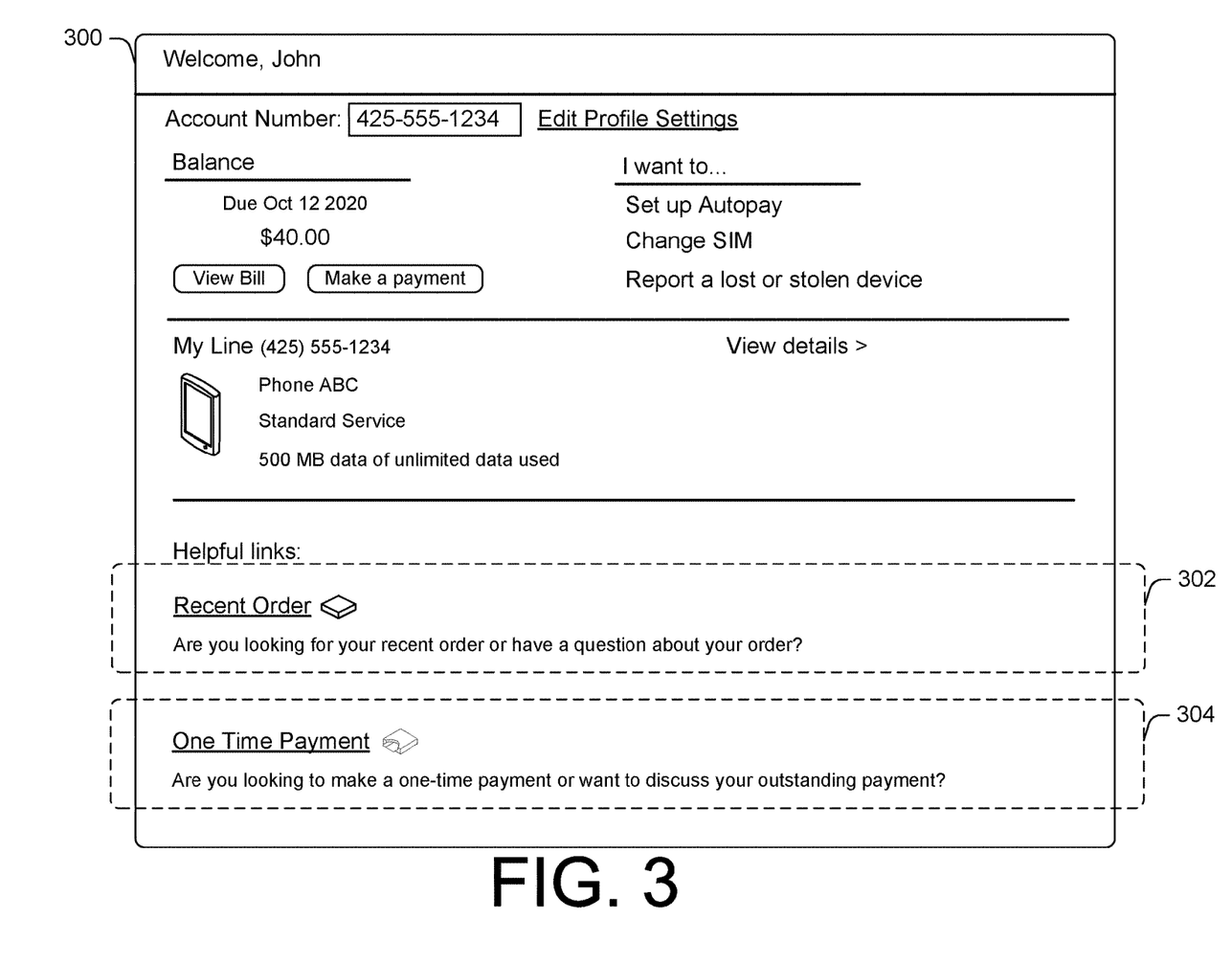
FIG. 3 shows an example web page that provides solutions for resolving issues that a customer is unable to resolve during a visit to the website of a service provider.

FIG. 3 shows an example web page that provides solutions for resolving issues that a customer is unable to resolve during a visit to the website of a service provider. A user interface screen 300 may be displayed by a web server as the customer 122 successfully logs into an online customer service portal. For example, the customer 122 may log into the online customer service portal via a set of authentication credentials. The user interface screen 300 may show user account information of the customer 122, such as user device and account balance information. Additionally, the user interface screen 300 may show an access link 302 that enables the customer 122 to look up information on a recent order. The access link 302 may be displayed because the call prediction application 104 predicted that the customer 122 is likely to call about an issue regarding the recent order after one or more previous visits to the website 102.

Alternatively, or concurrently, the user interface screen 300 may show an access link 304 that enables the customer 122 to make a one-time payment. The access link 304 may be displayed because the call prediction application 104 predicted that the customer 122 is likely to call about an issue regarding making a one-time payment after one or more previous visits to the website 102.

Example Processes

Figure 4:
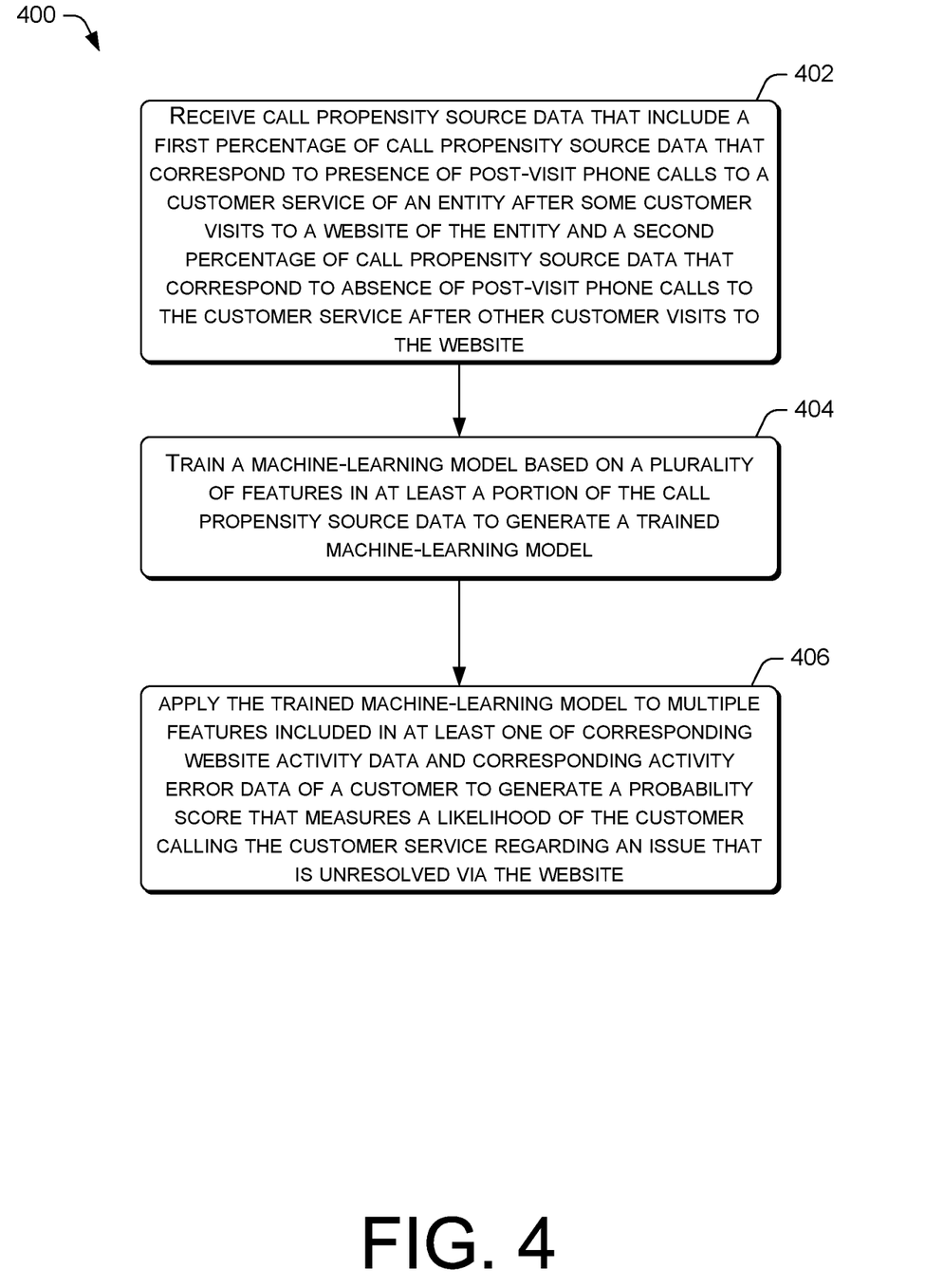
FIG. 4 is a flow diagram of an example process for training and applying a machine-learning model to generate a probability score that measures a likelihood of a customer calling customer service regarding an issue that is unresolved via a website of a service provider after visiting the website.
Figure 5:
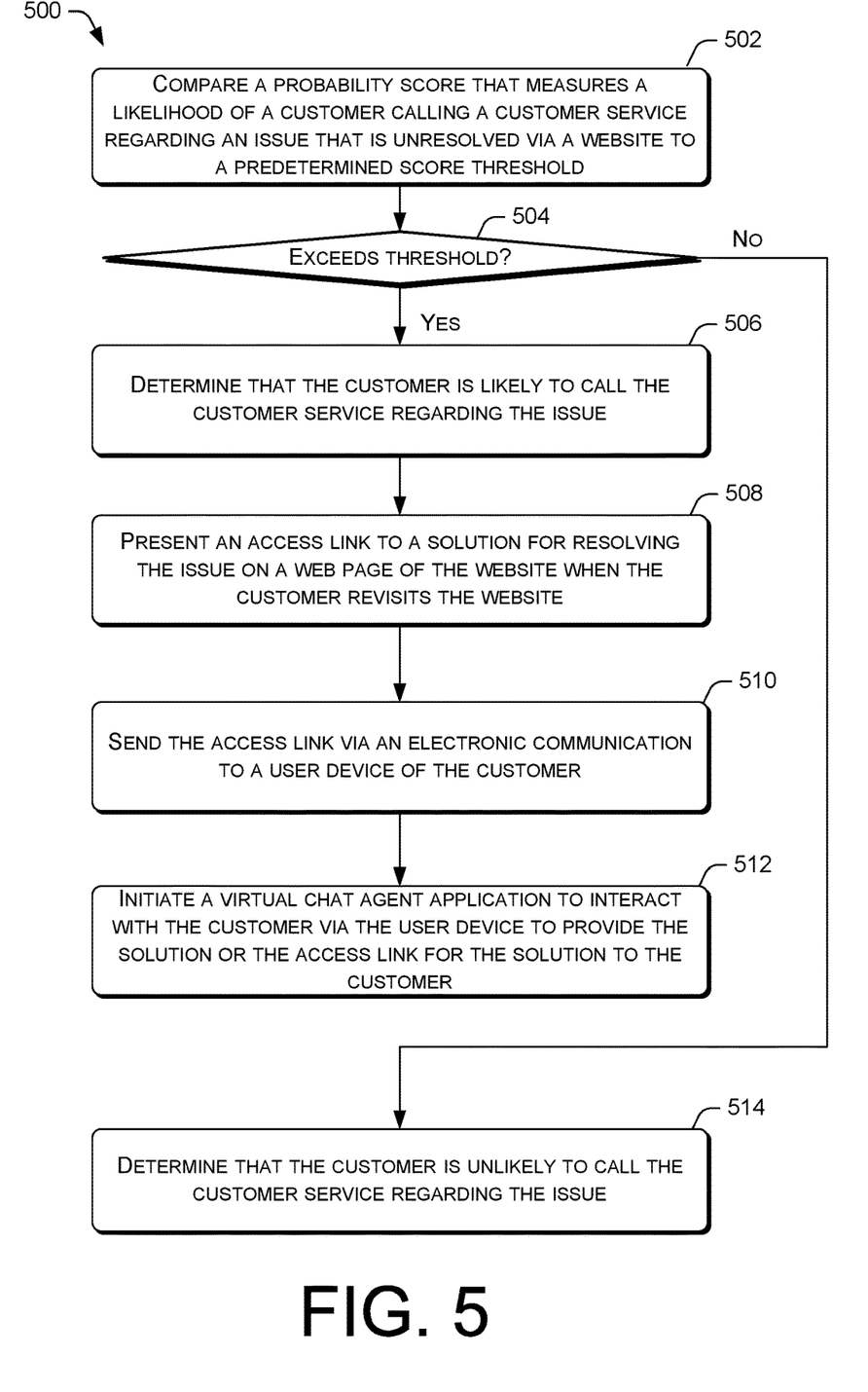
FIG. 5 is a flow diagram of an example process for providing solutions for resolving an issue that a customer is unable to resolve during a visit to the website of a service provider.

FIGS. 4 and 5 present illustrative processes 400 and 500 for use a machine-learning model to determine a post-visit phone call propensity of a customer to call customer service following a visit to a website of the service provider. Each of the processes 400 and 500 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400 and 500 are described with reference to the architecture 100 of FIG. 1.

FIG. 4 is a flow diagram of an example process 400 for training and applying a machine-learning model to generate a probability score that measures a likelihood of a customer calling customer service regarding an issue that is unresolved via a website of a service provider after visiting the website. At block 402, the call prediction application 104 may receive call propensity source data from one or more databases. In various embodiments, the call propensity source data may include a first percentage of call propensity source data that correspond to presence of post-visit phone calls to a customer service of an entity after some customer visits to a website of the entity and a second percentage of call propensity source data that correspond to absence of post-visit phone calls to the customer service of the entity after other customer visits to the web site of the entity. For example, the entity may be a service provider, such as an MNO that provides wireless telecommunication services.

At block 404, the call prediction application 104 may train a machine-learning model based on a plurality of features in at least a portion of the call propensity source data to generate a trained machine-learning model. In various embodiments, the portion of the call propensity source data may include website activity data, activity error data, and customer service call records of various customers. The machine-learning model may be trained by applying a model training algorithm, such as a Random Forest training algorithm, a Gradient Boost training algorithm, or an XG Boost training algorithm to the portion of the claim propensity source data.

At block 406, the call prediction application 104 may apply the trained machine-learning model to multiple features included in at last one of corresponding website activity data and corresponding activity error data of a customer to generate a likelihood of the customer calling the customer service regarding an issue that is unresolved via the website. In various embodiments, the trained machine-learning model may be validated using a test data set obtained the call propensity source data prior to the use of the trained machine-learning model to generate the probability score.

FIG. 5 is a flow diagram of an example process 500 for providing solutions for resolving an issue that a customer is unable to resolve during a visit to the web site of a service provider. At block 502, the call prediction application 104 may compare a probability score that measures a likelihood of a customer calling a customer service regarding an issue that is unresolved via a website to a predetermined score threshold.

At decision block 504, the call prediction application 104 may determine whether the probability score exceeds a score threshold. Accordingly, if the probability score exceeds the score threshold ("yes" at decision block 504), the process 500 may proceed to block 506. At block 506, the call prediction application 104 may determine that the customer is likely to call the customer again regarding the issue. At block 508, the call prediction application 104 may present the access link to a solution for resolving the issue on a web page of the website when the customer revisits the website. For example, the access link may be a link to a web page that is stored on a web server or a software application that is hosted on an application server.

At block 510, the call prediction application 104 may send the access link via an electronic communication to a user device of the customer. For example, the electronic communication may be an email message, a text message, or a client application notification message. At block 512, the call prediction application 104 may initiate a virtual chat agent to interact with a customer via the user device to provide the solution or the access link for the solution to the customer. For example, the virtual chat agent may be a server application that interacts with the customer via a client application that is installed on the user device. In other embodiments, the blocks 508-512 may be performed in various combinations of one or more blocks to provide the customer with access to the solution.

Returning to decision block 504, if the probability score does not exceed the score threshold ("no" at decision block 504), the process 500 may proceed to block 514. At block 514, the call prediction application 104 may determine that the customer is unlikely to call the customer service regarding the issue.

By using a trained machine-learning model to predict that certain customers are likely to call customer service following visits to the website of a service provider regarding unresolved issues and proactively providing these customers with solutions to the issues, the service provider may reduce the number of such post-visit phone calls to customer service while increasing customer satisfaction with the service provider. The reduction in the volume of customer calls to customer service may result in human resource and monetary savings for the service provider.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that upon execution cause one or more processors to perform acts comprising:

receiving call propensity source data that include a first percentage of call propensity source data that correspond to presence of post-visit phone calls to a customer service of an entity after some customer visits to a web site of the entity and a second percentage of call propensity source data that correspond to absence of post-visit phone calls to the customer service after other customer visits to the website;

apportioning the call propensity source data into a test data set and a training data set;

applying hybrid sampling to the training data set to increase the first percentage in the training data set such that a ratio of the first percentage and the second percentage in the training data set meets a predetermined ratio threshold;

training a machine-learning model based on a plurality of features in the training data set to generate a trained machine-learning model; and in response to the trained machine-learning model being validated via the test data set, applying the trained machine-learning model to multiple features included in at least one of corresponding web site activity data and corresponding activity error data of a customer to generate a probability score that measures a likelihood of the customer calling the customer service regarding an issue that is unresolved via the website.

2. The one or more non-transitory computer-readable media of claim 1, wherein the acts further comprise, in response to the probability score exceeding a predetermined score threshold; performing at least one of:

presenting an access link to a solution for resolving the issue on a web page of the website when the customer revisits the website;

sending the access link via an electronic communication to a user device of the customer; or initiating a virtual chat agent application to interact with the customer via the user device to provide the solution or the access link to the solution to the customer.

3. The one or more non-transitory computer-readable media of claim 1, wherein the call propensity source data comprise website activity data related to multiple customer visits to the web site of the entity by a plurality of customers, activity error data that are mapped to one or more of the multiple customer visits, and customer service call records of the plurality of customers, and wherein each call in the customer service call records is mapped as a dependent to a corresponding visit to the web site by a customer.

4. The one or more non-transitory computer-readable media of claim 3, wherein the plurality of features are indexed from the website activity data and the activity error data in the training data set.

5. The one or more non-transitory computer-readable media of claim 1, wherein the training includes training the machine-learning model using one of a Random Forest training algorithm, a Gradient Boost training algorithm, or a XG Boost training algorithm.

6. The one or more non-transitory computer-readable media of claim 1, wherein a phone call made by a customer to the customer service of the entity is classified as a post-visit phone call when the phone call is made within a predetermined time interval of the customer visiting the website of the entity.

7. The one or more non-transitory computer-readable media of claim 1, wherein the acts further comprise:

applying the trained machine-learning model to the plurality of features in additional website activity data and additional activity error data of additional customers to generate corresponding probability scores for the additional customers;

performing feature selection analysis to determine a list of top features of the plurality features that are most predictive of a customer calling the customer service; and re-training the machine-learning model based at least on the top features in the call propensity source data to generate a re-trained machine-learning model.

8. The one or more non-transitory computer-readable media of claim 1, the applying the hybrid sampling includes performing up-sampling by duplicating website activity data related to particular customer visits to the web site by one or more customers, activity error data that are mapped to one or more of the particular customer visits of the one or more customers, and customer service call records of the one or more customers, in which the one or more customers made post-visit phone calls to the customer service after visiting the website.

9. The one or more non-transitory computer-readable media of claim 8, wherein the applying the hybrid sampling further includes performing under-sampling of web site activity data related to specific customer visits to the website of the entity by one or more additional customers, activity error data that are mapped to one or more of the specific customer visits of the one or more additional customers, and customer service call records of the one or more additional customers, in which the one or more additional customers did not make post-visit phone calls to the customer service after visiting the website.

10. A system, comprising:

one or more processors; and memory including a plurality of computer-executable components that are executable by the one or more processors to perform a plurality of actions, the plurality of actions comprising:

receiving call propensity source data that include a first percentage of call propensity source data that correspond to presence of post-visit phone calls to a customer service of an entity after some customer visits to a web site of an entity and a second percentage of call propensity source data that correspond to absence of post-visit phone calls to the customer service after other customer visits to the website;

training a machine-learning model based on a plurality of features in at least a portion of the call propensity source data to generate a trained machine-learning model; and applying the trained machine-learning model to multiple features included in at least one of corresponding website activity data and corresponding activity error data of a customer to generate a probability score that measures a likelihood of the customer calling the customer service regarding an issue that is unresolved via the website.

11. The system of claim 10, wherein the call propensity source data comprise website activity data related to customer visits to the web site of the entity by a plurality of customers, activity error data that are mapped to one or more of the customer visits, and customer service call records of the plurality of customers, and wherein each call in the customer service call records is mapped as a dependent to a corresponding visit to the web site by a customer.

12. The system of claim 10, wherein the plurality of actions further comprise:

apportioning the call propensity source data into a test data set and a training data set;

applying hybrid sampling to the training data set to increase the first percentage in the training data set such that a ratio of the first percentage and the second percentage in the training data set meets a predetermined ratio threshold, wherein the training includes training the machine-learning model based on the plurality of features in the training data set of the call propensity source data.

13. The system of claim 12, wherein the plurality of features are indexed from website activity data and activity error data in the training data set.

14. The system of claim 12, wherein the plurality of actions further comprise validating the trained machine-learning model using the test data set, wherein the applying the trained machine-learning model includes applying the trained machine-learning model when the trained machine-learning is validated via the test data set.

15. The system of claim 12, wherein the applying the hybrid sampling includes performing up-sampling by duplicating website activity data related to particular customer visits to the web site by one or more customers, activity error data that are mapped to one or more of the particular customer visits, and customer service call records of the one or more customers, in which the one or more customers made post-visit phone calls to the customer service after visiting the website.

16. The system of claim 15, wherein the applying the hybrid sampling further includes performing under-sampling of website activity data related to specific customer visits to the web site of the entity by one or more additional customers, activity error data that are mapped to one or more of the specific customer visits, and customer service call records of the one or more additional customers, in which the one or more additional customers did not make post-visit phone calls to the customer service after visiting the website.

17. The system of claim 10, wherein the plurality of actions further comprise, in response to the probability score exceeding a predetermined score threshold; performing at least one of:

presenting an access link to a solution for resolving the issue on a web page of the website when the customer revisits the website;

sending the access link via an electronic communication to a user device of the customer; or initiating a virtual chat agent application to interact with the customer via the user device to provide the solution or the access link to the solution to the customer.

18. The system of claim 10, wherein the training includes training the machine-learning model using one of a Random Forest training algorithm, a Gradient Boost training algorithm, or a XG Boost training algorithm.

19. The system of claim 10, wherein a phone call made by a customer to the customer service of the entity is classified as a post-visit phone call when the phone call is made within a predetermined time interval of the customer visiting the website of the entity.

20. A computer-implemented method, comprising:

receiving, at one or more computing nodes, call propensity source data that include a first percentage of call propensity source data that correspond to presence of post-visit phone calls to a customer service of an entity after some customer visits to a web site of an entity and a second percentage of call propensity source data that correspond to absence of post-visit phone calls to the customer service after other customer visits to the website;

training, via the one or more computing nodes, a machine-learning model based on a plurality of features in at least a portion of the call propensity source data to generate a trained machine-learning model; and applying, via the one or more computing nodes, the trained machine-learning model to multiple features included in at least one of corresponding website activity data and corresponding activity error data of a customer to generate a probability score that measures a likelihood of the customer calling the customer service regarding an issue that is unresolved via the website.

* * * * *